United States Patent [19]

Dobosi

[11] 4,247,397
[45] Jan. 27, 1981

[54] EAVES TROUGH SHIELD

[76] Inventor: Laszlo J. Dobosi, 4317 Markwood La., Fairfax, Va. 22030

[21] Appl. No.: 92,837

[22] Filed: Nov. 9, 1979

[51] Int. Cl.³ .......................................... B01D 39/10
[52] U.S. Cl. .................................. 210/162; 210/474
[58] Field of Search .............. 210/153, 154, 170, 162, 210/163, 455, 469, 473, 474, 460, 475

[56] References Cited

U.S. PATENT DOCUMENTS

| | | | |
|---|---|---|---|
| 520,993 | 6/1894 | Keller | 210/162 |
| 571,711 | 11/1896 | Twist | 210/162 |
| 737,138 | 8/1903 | Ralston | 210/162 |
| 803,316 | 10/1905 | Vogel | 210/474 UX |
| 939,838 | 11/1909 | Hensler | 210/162 |
| 1,290,470 | 1/1919 | Yordy | 210/154 |
| 2,210,248 | 8/1940 | Lighthill | 210/162 |
| 2,669,197 | 2/1954 | Duzer | 210/162 |
| 2,875,712 | 3/1959 | Blau | 210/474 |
| 2,988,226 | 6/1961 | Campbell | 210/474 |
| 3,864,267 | 2/1975 | Nelems | 210/474 |

Primary Examiner—Theodore A. Granger
Attorney, Agent, or Firm—Larson, Taylor and Hinds

[57] ABSTRACT

An eaves trough shield is disclosed which is used to prevent the clogging of a downspout of an eaves trough. The trough shield portion is formed from a plurality of spaced fingers sloped over the downspout opening. At one end, the fingers are attached to a bridge-plate located at the top of the trough near the downspout of the trough. At the other end, the fingers are attached to a bottom plate which rests in the bottom of the trough away from the downspout. Flanges located at each side of the bridge-plate are used to secure the trough shield to the trough. When debris enters along the trough, it is moved to the trough shield by the action of water in the trough and deposited on the fingers. Later, after the debris has dried, it is blown off of the shield and out of the trough by the wind.

7 Claims, 4 Drawing Figures

U.S. Patent    Jan. 27, 1981    4,247,397
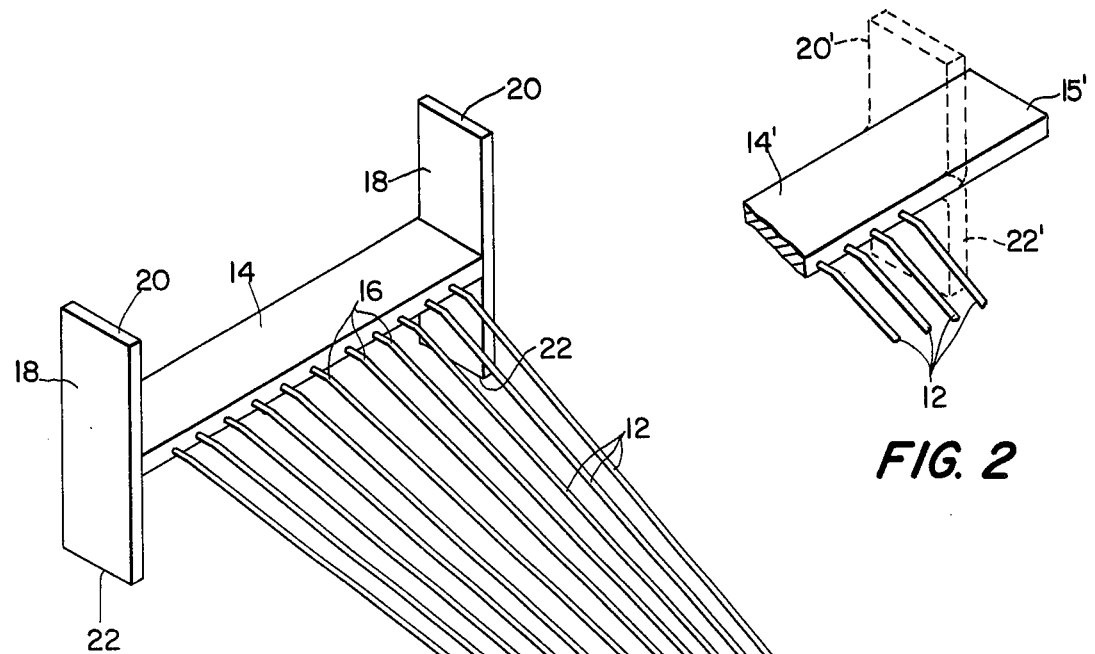
FIG. 1
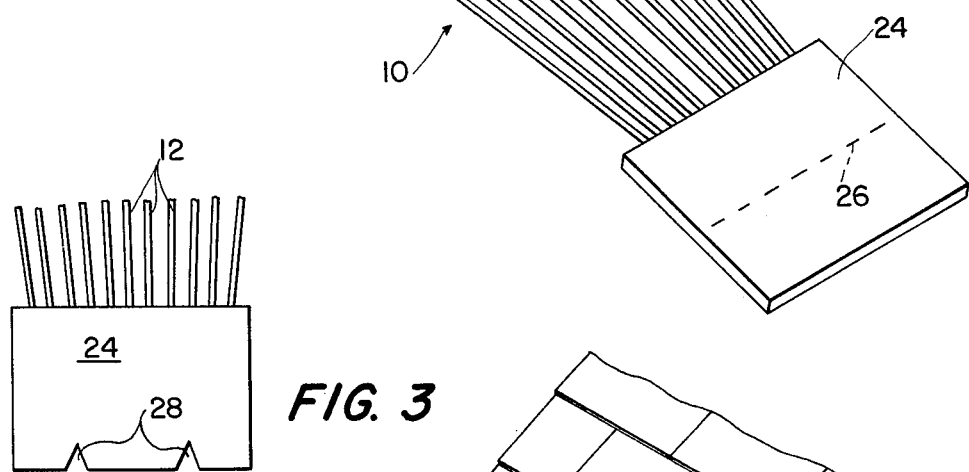
FIG. 2
FIG. 3
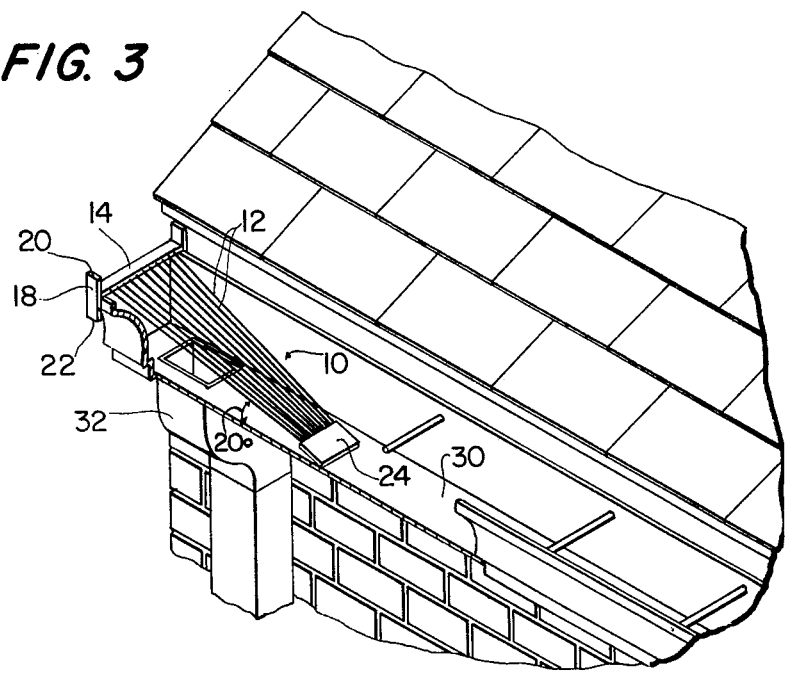
FIG. 4

EAVES TROUGH SHIELD

FIELD OF THE INVENTION

This invention relates generally to apparatus for keeping debris out of a downspout in an eaves trough and more particularly to an easily installed trough shield which not only keeps debris out of the downspout but provides a ramp so that the debris can be blown out of the eaves trough by the wind.

BACKGROUND OF THE INVENTION

The clogging of a downspout of an eaves trough with floating debris such as leaves has been a problem for a long time. One solution to this problem has been to prevent the debris from entering the trough by placing a strainer over the entire length of the trough. While effective, this solution requires a great length of strainer material which must be carefully placed and secured over the top edges of the trough.

In order to reduce the amount of strainer material needed, there has been disclosed in the prior art a number of devices which locate a small length of strainer material in the trough above the downspout. These strainers are inclined or sloped in the trough so that the debris backs up on the strainer. Devices such as these are disclosed in the following U.S. Pats.: No. 2,875,712 to Blau, No. 2,669,197 to Van Duzer, No. 571,711 to Twist, and No. 803,316 to Vogel.

Another type of device disclosed in the prior art uses a series of wires acting as a screen instead of a mesh-like strainer. For example, in U.S. Pats. No. 520,993 to Keller and No. 737,138 to Ralson a wire screen is placed over the opening of a downspout in a modified eaves trough. In both of these patents, the screen is inclined slightly downwards so that debris collected on the screen will slide off the end of the screen and fall out of the modified trough. However, for both of these devices, a modified trough must be used. A wire screen for a standard trough is disclosed in U.S. Pat. No. 2,210,248 to Lighthill. In this patent, a stepped screen is placed on a trough so that as debris accumulates, it is moved up from one step to the other by the water level and finally up and over the edge of the trough. Another prior art device having flexible fingers which can conform to the parallel troughs of a corrugated roof is disclosed in U.S. Pat. No. 3,864,267 to Nelems.

There are a number of disadvantages, however, to these prior art devices. The devices using meshed strainer material in a trough are subject to plugging as the debris get stuck in the apertures of the strainer. This plugging is further increased as the water pressure behind the debris builds up. The devices using wire screens also suffer disadvantages. For some of these devices, a modified or custom trough must be used. In addition, most of the devices can not be easily adapted to fit the variety of trough shapes which are in existence. The screen with flexible fingers can be used in a variety of corrugated roof troughs but the flexible fingers would be unsuited for a single large trough as the fingers would be easily forced to flex out of the way of the debris pushed by the water.

SUMMARY OF THE PRESENT INVENTION

The present invention provides an eaves trough shield for preventing debris in the trough from entering and clogging a downspout. The device can be easily and quickly attached in any shaped trough by a person without any special skills or tools. According to a preferred embodiment, the invention comprises a bridge-plate with flanges at each end and with a plurality of spaced fingers in a fan shape terminating at a bottom plate. The fingers act as a shield and the bottom plate is easily cut to any shape of trough in which the trough shield is used. In addition, the flanges on the bridge-plate are used to attach the trough shield easily and quickly to the eaves trough.

Once in place, the trough shield needs no further maintenance. As the debris is washed towards the downspout, it piles up on the shield as the water drains by. Later, after the debris has dried, it is blown up the ramp-like fingers and out of the trough by the wind.

Other features and advantages of the present invention are stated in or apparent from the detailed description of a presently preferred embodiment of the invention found hereinbelow.

BRIEF DESCRIPTION OF THE DRAWINGS

FIG. 1 is a perspective view of a preferred embodiment of a trough shield of the present invention.

FIG. 2 is a perspective view of an alternative embodiment of the bridge-plate of the present invention.

FIG. 3 is a top view of the bottom plate of the trough shield of the present invention after it has been trimmed for use in a trough.

FIG. 4 is a cut-away view of the trough shield of the present invention in place in an eaves trough.

DETAILED DESCRIPTION OF THE PREFERRED EMBODIMENT

With reference now to the drawings in which like numeral represent like elements throughout the several views, a presently preferred embodiment of the present invention is depicted in FIG. 1 and comprises an eaves trough shield 10 in which an inclined shield portion is formed by a plurality of spaced fingers 12. Fingers 12 have a round cross-section and are attached at their upper end to a bridge plate 14. In order for fingers 12 to be inclined with respect to bridge-plate 14, fingers 12 have slight bends 16 just before they are attached to bridge-plate 12. At each end of bridge-plate 14 is a flange 18 which extends substantially perpendicular to bridge-plate 14. As shown, each flange 18 has an upper portion 20 and a lower portion 22. The lower end of fingers 12 are attached to an imperforate bottom plate 24 and are spaced closer together than at the upper end giving fingers 12 a fan shape.

Instead of flanges 18, bridge-plate 14' can have an extended length portion 15' as indicated in FIG. 2. In this embodiment, bridge-plate 14' is made of an easily bendable material so that extended portion 15' can be easily bent, as along the dotted line, to form either an upper flange 20' or a lower flange 22' (shown in dotted lines).

As shown in FIG. 3, when eaves trough shield 10 is to be placed in an eaves trough, it is easily cut to conform to the shape of the bottom of the trough. For a relatively flat trough, bottom plate 24 is cut along a dotted line 26. Preferably, bottom plate 24 should be trimmed so as to have a length of between 1 and 2 inches. As a minimum, bottom plate 24 should have a length of at least ¼ inch and preferably be at least ½ inch long. The reason for this short length of solid bridge-plate 24 is so that as the water drains toward shield 10, the momentum of the water forces the carried debris to strike bridge-plate 24 and be force up onto fingers 12. Bottom plate 24 thus acts as an imperforate ramp for permitting debris to be forced onto the upwardly inclined surface defined by the finger members. It is anticipated that the trimming of bottom plate 24 will not result in an exact fit with the bottom of the trough so that as the debris piles up on fingers 12 the water will seep underneath of bottom plate 24. To insure that water will seep below bottom plate 24, notches 28 can be cut along the bottom edge of bottom plate 24.

FIG. 4 shows eaves trough shield 10 installed in a substantially horizontal eaves trough 30 with a downspout 32 at one end. As discussed above, in order to install eaves trough shield 10 in trough 30, bottom plate 24 is first trimmed to conform to the shape of the bottom of trough 30. Next, bridge-plate 14 is placed on top of trough 30 so that fingers 12 lie above the opening of downspout and bottom plate 24 rests on the bottom of trough 30 on the uphill side of the opening of downspout 32. Fingers 12 are inclined at between a 10° to 30° angle with respect to trough 30 and are preferably inclined at about a 20° angle as shown. Within this range of angles, the overall length of trough shield 10 in a standard 4" deep trough would be between 8" and 24", and preferably about 12". In position, flanges 18 can be used to secure trough shield 10 to trough 30. If trough 30 is so shaped and sized that bottom portions 22 of flanges 18 resiliently grip the sides of trough 30, this may be all that is needed to hold trough shield 10 in place. Alternatively, bottom portions 22 can be bent around trough 30 or riveted to trough 30. In addition, instead of using bottom portions 22, trough 10 can be held in place relative to trough 30 which is normally attached to the eaves facia board, by attaching the upper portion 20 of flange 18 resting against the eaves facia board to the eaves facia board itself by a nail or the like. The embodiment of bridge-plate 14' depicted in FIG. 2 can similarly be used to secure trough shield 10 to trough 30 by bending portion 15' appropriately. Any of the above methods may be easily and quickly performed by an inexperienced person to secure eaves trough shield 10 in place.

In operation, eaves trough shield 10 functions in the following manner. When water enters along the length of trough 30, it carries any floating debris along with it as it moves towards downspout 32. While trough 30 appears substantially horizontal, in actuality there is a slight slope to it, typically about 1 inch every 12 feet. Thus, as the water and debris reaches eaves trough shield 10, the debris merely impinges on bottom plate 24 and piles up on fingers 12 while the water seeps below and around bottom plate 24. In an unusually heavy water flow in trough 30, the debris is lifted up higher on fingers 12 and water flows through fingers 12 and downspout 32. In any condition, fingers 12 keep debris from passing into downspout 32 where it often eventually results in clogging of downspout 32. Later, after the debris which is piled onto fingers 12 has dried, it is easily blown out of trough 30 by the wind. In this regard, bridge-plate 24 and fingers 12 act as a ramp for guiding the dried debris up and out of trough 30.

In the preferred embodiment, the entire eaves trough shield 10 is made of a plastics material. However, it should be obvious to one skilled in the art that the present invention may also be made from metal or even a combination of the two. It should be noted that for the embodiment depicted in FIG. 2, bridge-plate 14' must be made of a readily malleable material so that extended portion 15' can be easily bent to the desired shape. Also, while fingers 12 in this embodiment are round so that there are no tiny edges along its length to catch debris on, any shape of fingers which are relatively smooth will function just as well.

While the present invention has been described in use with an eaves trough having a downspout at one end, it should be appreciated that this device can be used on either end of the trough where the downspout is located. In addition, this device can be used where a downspout is located between the two ends of the trough by using two such devices. In this case, the fingers of each device would point in opposite directions so as to prevent debris from entering the downspout from either direction.

Although the present invention has been described in detail with respect to an exemplary embodiment thereof, it will be understood by those of ordinary skill in the art that variations and modification may be effected within the scope and spirit of the invention.

I claim:

1. An eaves through shield for use in a substantially horizontal eaves trough having a downspout comprising:
   a bridge-plate;
   means for securing said bridge-plate to a trough;
   a plurality of spaced apart elongate finger members with their upper ends connected to said bridge plate;
   a lower bottom plate with its upper edge connected to the lower ends of said elongate finger members and constructed and arranged to be trimmable to fit the bottom of a trough and to produce an imperforate ramp for permitting debris to be forced onto the upwardly inclined surface defined by said elongate finger members, said finger members being spaced closer together at said bottom plate than at said bridge-plate so as to form a fan shaped shield;
   such that in use said bridge-plate extends across the top of the trough from one side to the other, said bottom plate rests on the bottom of the trough, and said elongate finger members lie above the downspout and prevent debris from entering the downspout whereby the debris moved onto said finger members is later dried and blown up along the upwardly inclined finger members and out of the trough by the wind.

2. An eaves trough shield as claimed in claim 1 wherein the lower edge of said bottom plate which rests on the bottom of the trough has a plurality of notches to allow water to pass beneath said plate.

3. An eaves trough shield as claimed in claim 1 wherein said finger members are inclined at about a 10°–30° angle to the trough.

4. An eaves trough shield as claimed in claim 1 wherein said finger members have a round cross-section.

5. An eaves trough shield as claimed in claim 1 wherein the eaves trough shield is made entirely of a plastics materials.

6. An eaves trough shield as claimed in claim 1 wherein said means to secure said bridge-plate to the trough comprises a flange located at each end of said bridge-plate, said flange extending substantially perpendicularly to said bridge-plate.

7. An eaves trough shield as claimed in claim 1 wherein said means to secure said bridge-plate to the trough comprises an extended portion of said bridge-plate which is bendable to form an upper or lower flange.

* * * * *